(12) United States Patent
Chiu (10) Patent No.: US 8,677,872 B2
(45) Date of Patent: Mar. 25, 2014

(54) SAWING MACHINE HAVING A MITER ANGLE ADJUSTMENT ASSEMBLY

(75) Inventor: Cheng-Hung Chiu, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 261 days.

(21) Appl. No.: 13/073,210

(22) Filed: Mar. 28, 2011

(65) Prior Publication Data

US 2011/0232449 A1 Sep. 29, 2011

(30) Foreign Application Priority Data

Mar. 29, 2010 (TW) .............................. 99109399 A (51) Int. Cl.
 *B27B 5/36* (2006.01)
(52) U.S. Cl.
 USPC ................ 83/473; 83/471.3; 83/490; 83/580
(58) Field of Classification Search
 USPC ........... 83/851, 471.3, 490, 473, 581, 698.41, 83/698.31, 698.11
 See application file for complete search history.

(56) References Cited

U.S. PATENT DOCUMENTS

| 4,011,782 | A | * | 3/1977 | Clark et al. | 83/471.3 |
| 5,249,496 | A | * | 10/1993 | Hirsch et al. | 83/471.3 |
| 5,937,720 | A | * | 8/1999 | Itzov | 83/397 |
| 6,474,206 | B1 | | 11/2002 | Brunson | |
| 6,474,207 | B1 | * | 11/2002 | Itzov | 83/471.3 |
| 6,513,412 | B2 | * | 2/2003 | Young | 83/471.3 |
| 6,595,095 | B2 | | 7/2003 | Chen | |
| 7,201,090 | B2 | * | 4/2007 | Svetlik et al. | 83/471.3 |
| 7,275,470 | B2 | * | 10/2007 | Bettacchini | 83/490 |
| 7,530,297 | B2 | * | 5/2009 | Carroll et al. | 83/471.3 |
| 7,631,587 | B2 | * | 12/2009 | Svetlik et al. | 83/471.3 |
| 7,798,041 | B2 | * | 9/2010 | Hetcher et al. | 83/471.3 |
| 7,938,050 | B2 | * | 5/2011 | Gehret | 83/471 |
| 2004/0060412 | A1 | * | 4/2004 | Kao | 83/581 |
| 2004/0074362 | A1 | * | 4/2004 | Svetlik et al. | 83/473 |
| 2004/0154448 | A1 | * | 8/2004 | Romo et al. | 83/471.3 |

FOREIGN PATENT DOCUMENTS

CN 201061835 Y 5/2008

* cited by examiner

*Primary Examiner* — Omar Flores Sanchez
(74) *Attorney, Agent, or Firm* — Bacon & Thomas, PLLC (57) ABSTRACT

A sawing machine having a miter angle adjustment assembly includes a machine base, a worktable rotatably connected to the machine base and rotatable about an axis, a cutter unit mounted to the worktable, a tightening member to lock movement of the worktable relative to the machine base and a driving device set. The driving device set includes a driving member pivotally mounted to the worktable and an eccentric member coaxially rotatable with the driving member to move the tightening member. The eccentric member is controllable by the driving member to rotate between a first position and a second position to move the tightening member into engagement with or away from the machine base.

14 Claims, 6 Drawing Sheets

SAWING MACHINE HAVING A MITER ANGLE ADJUSTMENT ASSEMBLY

This application claims, under 35 U.S.C. §119, priority to Taiwanese Application No. 099109399, filed Mar. 29, 2010, which application is hereby incorporated by reference in its entirety, inclusive of the specification, claims, and drawings.

FIELD OF THE INVENTION

The present disclosure relates to sawing machine technology and more particularly, to a sawing machine having a miter angle adjustment assembly.

BACKGROUND

A conventional sawing machine, such as those of the type disclosed in U.S. Pat. No. 6,595,095, U.S. Pat. No. 6,474,206, and China Patent No. 201061835, mainly includes a machine base unit for supporting a workpiece for cutting, a biased swinging arm pivotally mounted at one side of the machine base unit and pivotal about a pivot axis and swingable about a swinging axis, and a saw blade rotatably mounted to the swinging arm and rotatable about a rotation axis and adapted for cutting a workpiece. By way of the pivotability of the swing arm and a rotating function of the machine base unit, the saw blade can cut the workpiece at a tilted cutting angle as desired, or the saw blade can be adjusted relative to the workpiece to any desired cutting angle.

Figure 1:
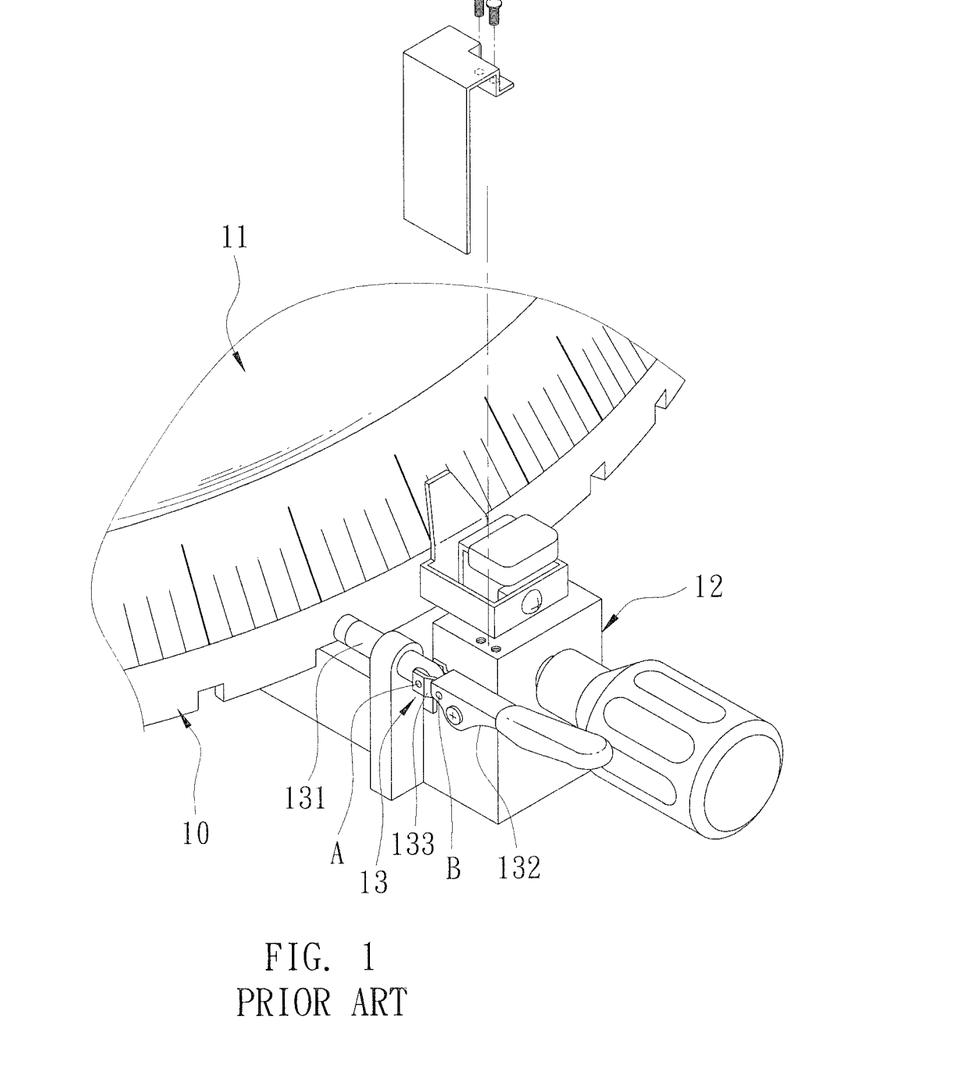
FIG. 1 is an elevational view of a pivotable handle and angle adjustable device for a miter saw according to U.S. Pat. No. 6,595,095.

FIG. 1 illustrates a miter saw constructed according to U.S. Pat. No. 6,595,095. According to this design, the miter saw includes a fixed base 10, a bench 11 rotatably mounted on the base 10, an extension holder member 12 movable with the bench 11 and extending out of and away from the base 10, a cutter unit (not shown) mounted on the bench 11, and a positioning device set 13. The positioning device set 13 includes a positioning member 131 inserted through the extension holder member 12, a lever 132 pivotally connected to the extension holder member 12, and a link 133 pivotally coupled between the positioning member 131 and the lever 132.

Thus, when the lever 132 is rotated downwards, the link 133 causes the positioning member 131 to move away from the base 10, allowing free movement of the extension holder member 12 in order to adjust the angle of the bench 11, and hence the workpiece, relative to the cutter unit. When the lever 132 is rotated upwards, the link 133 causes the positioning member 131 to move into engagement with the base 10, thereby locking the bench 11 from rotation relative to the base 10.

The aforesaid positioning device set 13 can be operated to lock or unlock the bench 11. However, because the tightening pressure of the positioning member 131 is determined subject to the amount of extension of the lever 132 and the link 133 and because two pivot points A and B are provided between the positioning member 131, the lever 132, and the link 133, the reaction force produced upon engagement between the positioning member 131 and the base 10 will be concentrated at the pivoted points A and B. If the extension amount of the link 133 is too small, the tightening pressure will be insufficient to lock the rotation of the bench 11 with respect to the base 10. If the extension amount of the link 133 is too large, a large effort will be needed to rotate the lever 132 and therefore, structural damage may occur.

SUMMARY

The present disclosure has been accomplished under the circumstances in view. Therefore, a sawing machine having a miter angle adjustment assembly of the present disclosure is provided to improve the structural strength and positioning stability, and enhance the practicability and convenience of the use of the machine.

To achieve this and other objects, a sawing machine according to the present disclosure includes a body unit, a carrier unit, a tightening member, and a driving device set.

The body unit has a machine base and a worktable rotatably mounted on the machine base and rotatable about an axis. The cutter unit is mounted to the worktable corresponding to the machine base. The tightening member is also mounted to the worktable corresponding to the machine base.

The driving device set includes a driving member rotatably mounted to the worktable and an eccentric member rotatable with the driving member to move the tightening member. The eccentric member is forwardly and backwardly rotatable with the driving member between a first position, where the tightening member is moved by the eccentric member into engagement with the machine base, and a second position, where the tightening member is moved away from the machine base by the eccentric member.

By using the eccentric action of the eccentric member according to the disclosure in order to move the tightening member into engagement with the machine base, the structural strength of the machine is improved, as well as enhancing the positioning stability of the parts of the machine.

DETAILED DESCRIPTION

Figure 2:
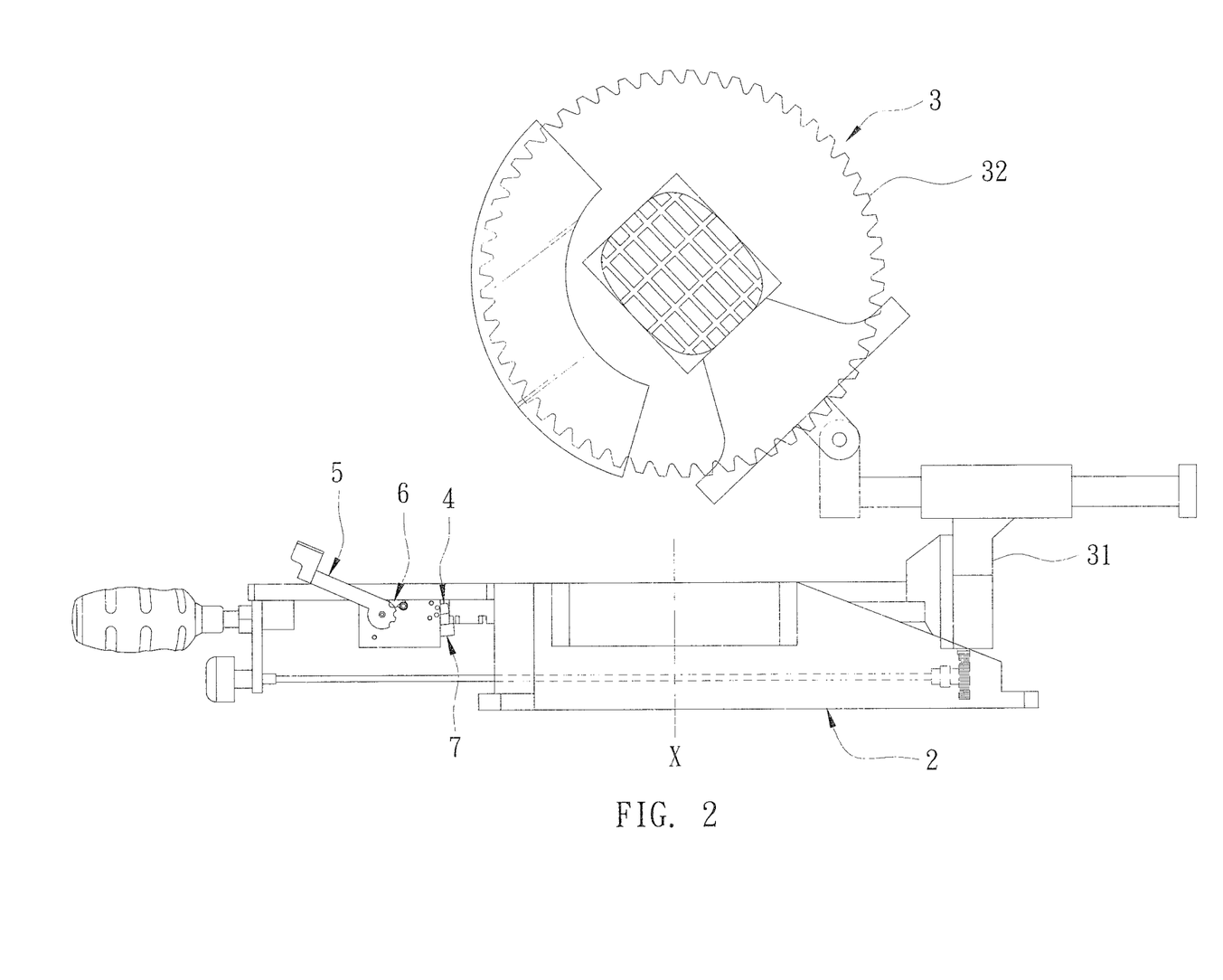
FIG. 2 is a front view of a sawing machine in accordance with an exemplary embodiment of the present disclosure.
Figure 3:
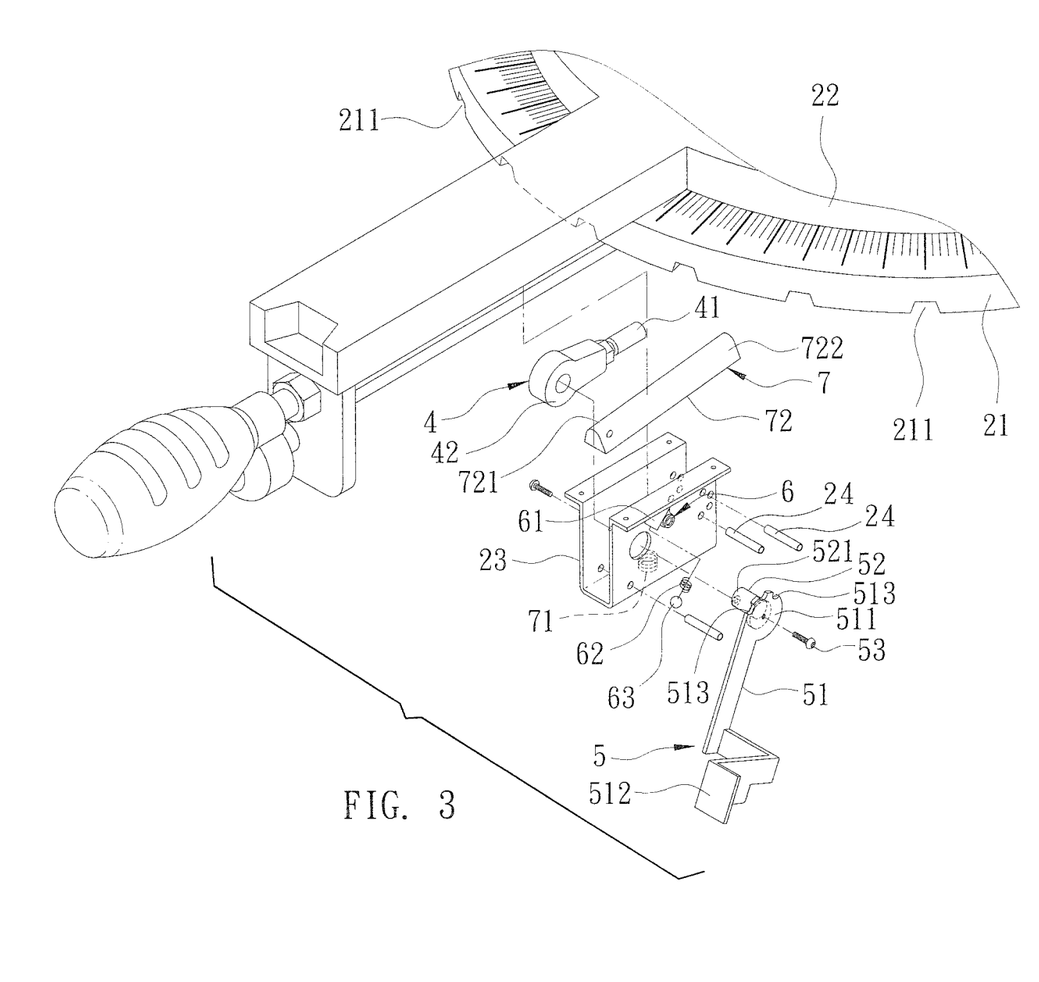
FIG. 3 is an exploded view, in an enlarged scale, of a part of the sawing machine shown in FIG. 2.
Figure 4:
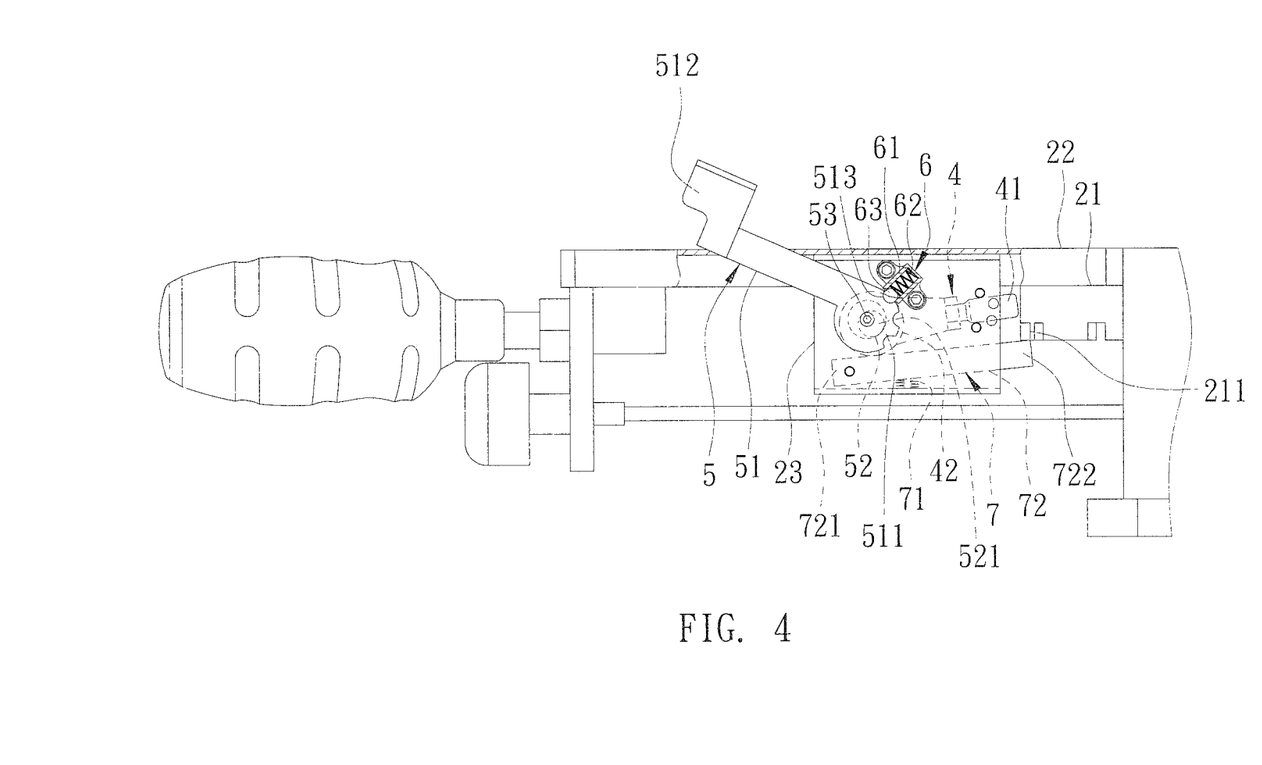
FIG. 4 is a front view of a part of the sawing machine shown in FIG. 2, illustrating the tightening member in an unlocked status.

Referring to FIGS. 2 through 4, a sawing machine having a miter angle adjustment assembly in accordance with the present disclosure is shown including a body unit 2, a cutter unit 3, a tightening member 4, a driving device set 5, a safety device set 6, and a stop device set 7.

The body unit 2 has a machine base 21, a worktable 22 rotatably connected to the machine base 21 and rotatable about an axis X, a substantially U-shaped carrier 23 fixedly mounted on a bottom wall of the worktable 22, and two limiter pins 24.

The machine base 21 has a plurality of notches 211 located on the periphery thereof and spaced around the axis X. The notches 211 are spaced from one another at a predetermined angle, for example, 15 degrees. The two limiter pins 24 are mounted at one end of the carrier 23 adjacent to the machine base 21 in a parallel manner.

The cutter unit 3 includes a swinging arm 31 pivotally mounted to the worktable 22, and a saw blade 32 rotatably mounted to the swinging arm 31.

The tightening member 4 is mounted in the carrier 23 at the worktable 22 corresponding to the machine base 21, and has a first end portion 41 facing the machine base 21 and suspended between the limiter pins 24, and a second end portion 42 opposed to the first end portion 41. The second end portion 42 in this embodiment includes an eyelet.

The driving device set 5 includes a driving member 51, an eccentric member 52, and a pivot member 53. The driving member 51 has a coupling end portion 511 located on one end thereof and inserted into the inside of the carrier 23, an operating end portion 512 located on an opposite end thereof and disposed outside of the carrier 23 (and therefore spaced from the worktable 22), and three retaining notches 513 located on and spaced around the periphery of the coupling end portion 511.

The eccentric member 52 is fixedly located on the coupling end portion 511 of the driving member 51 and coupled to the second end portion 42 of the tightening member 4. The pivot member 53 is inserted through the carrier 23 and an eccentric part of the coupling end portion 511 of the driving member 51 and the eccentric member 52 to coaxially and pivotally connect the driving member 51 and the eccentric member 52 to the carrier 23, thus enabling the driving member 51 and the eccentric member 52 to be rotated on the pivot 53, and further enabling the eccentric member 52 to provide an eccentric protrusion 521.

The safety device set 6 includes a barrel 61 fixedly mounted at one side of the carrier 23, a spring member 62 accommodated within the barrel 61, and a ball 63 positioned between the spring member 62 and the coupling end portion 511 of the driving member 51. The ball 63 receives pressure from the spring member 62 within the barrel 61 and the coupling end portion 511 of the driving member 51, and is biased into engagement with a selected one of the retaining notches 513 subject to rotation of the driving member 51.

The stop device set 7 includes a spring member 71 mounted in the carrier 23, and a stop member 72 positioned between the spring member 71 and the eccentric member 52. The stop member 72 has a coupling portion 721 located on one end thereof and pivotally connected to the carrier 23, and a stop portion 722 located on an opposite end thereof for selectively engaging one of the plurality of notches 211 of the machine base 21.

Figure 6:
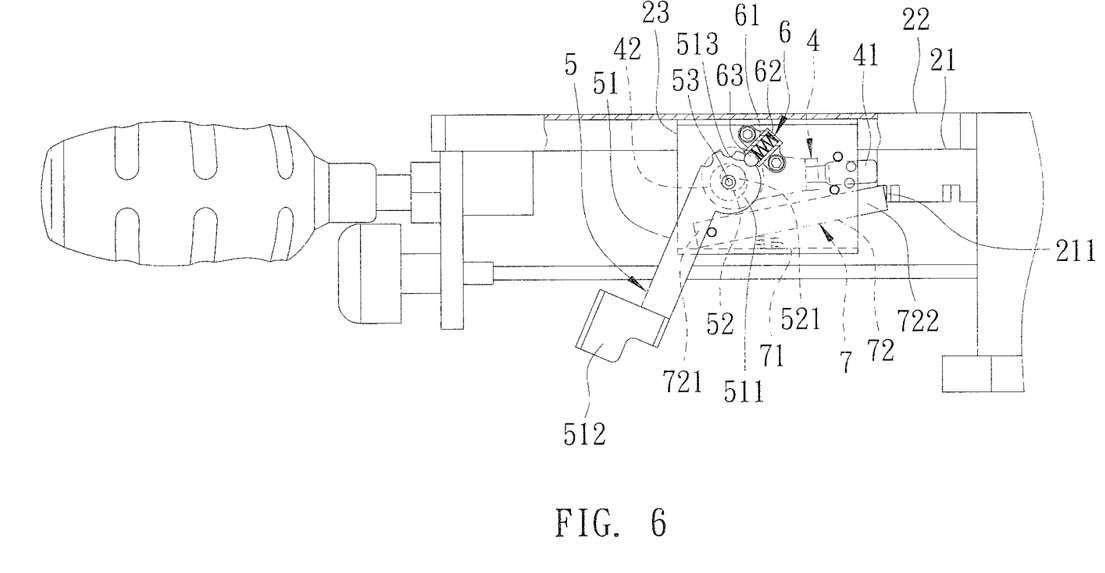
FIG. 6 is a front view of a part of the sawing machine shown in FIG. 2, illustrating the tightening member moved into engagement with the machine base and locking rotation of the worktable with respect to the machine base.

When a user rotates the operating end portion 512 of the driving member 51 upwards to the position where the ball 63 is biased by the spring member 62 into engagement with the first retaining notch 513, the driving member 51 will drive the eccentric member 52 to rotate on the pivot 53 in a clockwise direction from a first position (the reverse limit position) shown in FIG. 6 to a second position (the forward limit position) shown in FIG. 4. At this time, the eccentric protrusion 521 of the eccentric member 52 will cause the second end portion 42 of the tightening member 4 to move towards the bottom left corner of the carrier 23, thus causing the first end portion 41 of the tightening member 4 to be moved linearly in the reversed direction away from the machine base 21 subject to the limitation of rotational movement of the first end portion 41 due to the limiter pins 24.

At the same time, the coupling end portion 511 of the driving member 51 will also move the stop member 72 downwards to compress the spring member 71 and to move the stop portion 722 away from the notches 211 of the machine base 21, therefore allowing rotation of the worktable 22 to adjust the cutting angle.

Figure 5:
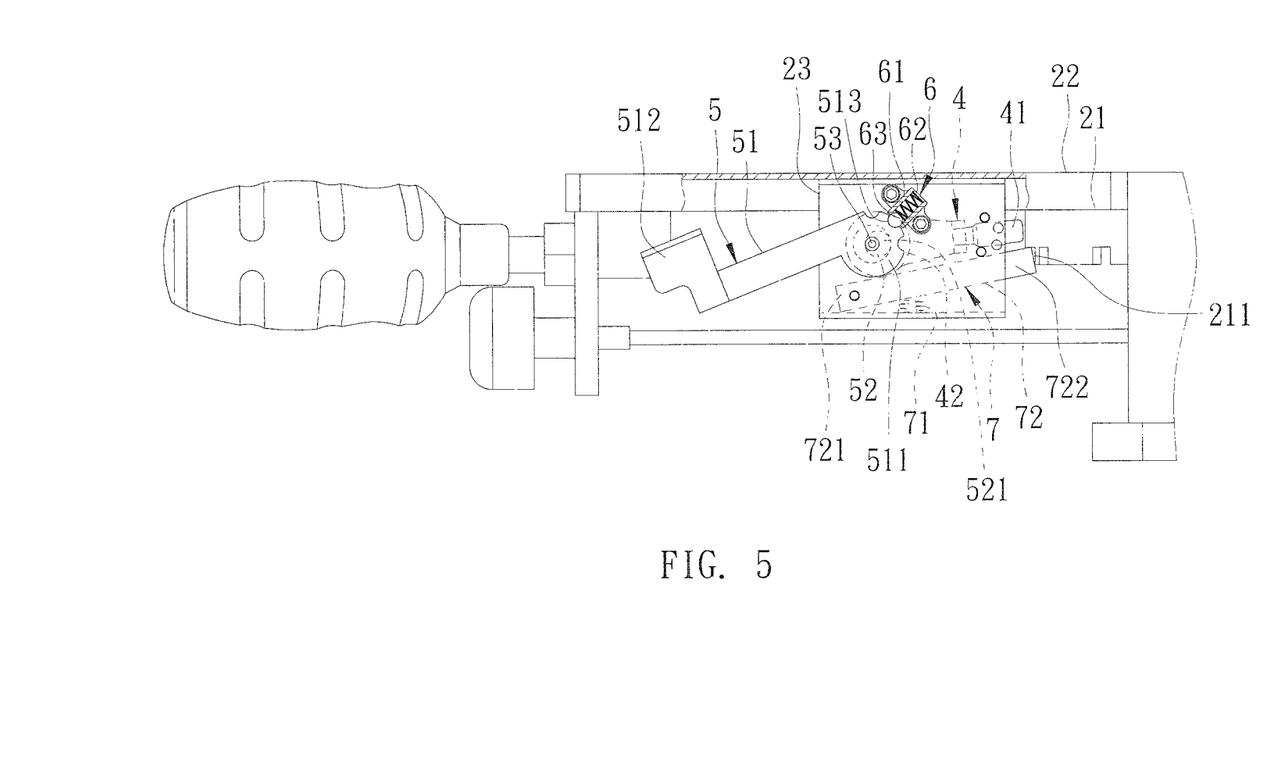
FIG. 5 is a front view of a part of the sawing machine shown in FIG. 2, illustrating the tightening member moved relative to the machine base.

Referring to FIGS. 3 and 5, when a user rotates the operating end portion 512 of the driving member 51 downwards to the position where the ball 63 is biased by the spring member 62 into engagement with the second retaining notch 513, the driving member 51 will drive the eccentric member 52 to rotate on the pivot 53 in a counter-clockwise direction to a third position between the aforesaid first position and the aforesaid second position. At this time, the eccentric protrusion 521 of the eccentric member 52 will cause the second end portion 42 of the tightening member 4 to move towards the upper right corner of the carrier 23 and away from the stop member 72, thus enabling the stop member 72 to be biased by the spring member 71 into engagement with a corresponding notch 211 of the machine base 21. Therefore, when the worktable 22 is rotated to a specific desired angle, rotation thereof can be stopped in the respective desired position by engagement of the stop member 72 with a corresponding notch 211 of the machine base 21.

Referring to FIGS. 3 and 6, when a user continuously rotates the operating end portion 512 of the driving member 51 downwards to the position where the ball 63 is biased by the spring member 62 into engagement with the third retaining notch 513, the driving member 51 will keep driving the eccentric member 52 to rotate on the pivot 53 in the counter-clockwise direction from the second position shown in FIG. 4 to the first position shown in FIG. 6. At this time, the eccentric protrusion 521 of the eccentric member 52 will continuously urge the second end portion 42 of the tightening member 4 toward the upper right corner if the carrier 23, causing the first end portion 41 of the tightening member 4 to be moved linearly toward the machine base 21 subject to the limitation of rotational movement of the first end portion 41 due to the limiter pins 24 and then forced into engagement with the machine base 21 to lock rotation of the worktable 22 relative to the machine base 21.

Further, during rotation of the driving member 51, the ball 63 will be forced by the biased engagement thereof with the coupling end portion 511 of the driving member 51 to vibrate and then to click or snap into engagement with one retaining notch 513 of the driving member 51. Thus, vibration of the ball 63 enables the user to be aware of the rotating status of the driving member 51. When the ball 63 is biased into engagement with one retaining notch 513 of the driving member 51, the driving member 51 is selectively locked in position.

In conclusion, the disclosure provides a sawing machine having a miter angle adjustment assembly that has the following advantages and effects.

The disclosure utilizes the eccentric action of the eccentric member 52 to match with the specially designed relationship between the driving member 51 and the eccentric member 52 and tightening member 4, enabling a rotary force to be directly converted into a linear force to move the tightening member 4 between a locking position where the worktable 22 and the machine base 21 are locked and an unlocking position where the worktable 22 and the machine base 21 are unlocked. Thus, this arrangement greatly improves the structural strength and positioning stability, and enhances the practicability and convenience of the use of the machine.

Although a particular embodiment of the disclosure has been described in detail for purposes of illustration, various modifications and enhancements may be made without departing from the spirit and scope of the disclosure. Accordingly, the disclosure is not to be limited except as by the appended claims.

What is claimed is:

1. A sawing machine, comprising:
a body unit having a machine base and a worktable rotatably mounted on said machine base and rotatable about an axis;
a tightening member mounted with said worktable and having a first end portion facing said machine base and a second end portion opposed to said first end portion;
a driving device set having a driving member rotatably mounted to said worktable and an eccentric member rotatable with said driving member to move said tightening member, said eccentric member being rotatable with said driving member forwardly and backwardly at least between a first position, where said tightening member is moved by said eccentric member into engagement with said machine base, and a second position, where said tightening member is moved away from said machine base by said eccentric member;
wherein the second end portion of said tightening member is movable by said eccentric member and includes an eyelet configured to receive said eccentric member
a carrier fixedly mounted on a bottom wall of said worktable to carry said driving device set and said tightening member, said carrier comprising two limiter pins mounted in one end of said carrier adjacent to said machine base;
said tightening member having the first end portion thereof inserted between said two limiter pins;
said driving device set further comprising a pivot member;
said driving member comprising a coupling end portion and an opposed operating end portion disposed outside said carrier;
said eccentric member fixedly located on the coupling end portion of said driving member and coupled to the second end portion of said tightening member; and
said pivot member inserted through said carrier and said coupling end portion of said driving member and said eccentric member for allowing rotation of said driving member and said eccentric member together on said pivot member.

2. The sawing machine according to claim 1, further comprising a safety device set mounted to said worktable, wherein said driving member further comprises a plurality of retaining notches located on and spaced around the periphery of the coupling end portion thereof; and
said safety device set comprises a barrel fixedly mounted at one side of said carrier, a spring member accommodated in said barrel and a ball positioned between the spring member in said barrel and the coupling end portion of said driving member, said ball being biased by said spring member into selective engagement with one of the plurality of retaining notches.

3. The sawing machine according to claim 1, further comprising a stop device set, wherein said machine base comprises a plurality of notches located on the periphery thereof and spaced around said axis; and
said stop device set comprises a spring member mounted in said carrier and a stop member positioned between the spring member of said stop device set and said eccentric member, said stop member biased by the spring member of said stop device set to selectively engage one of the notches of said machine base subject to rotation of said eccentric member in releasing the pressure of the spring member of said stop device set to allow the stop member to disengage from the respective notch.

4. The sawing machine according to claim 3, wherein when said stop member is engaged with a selected notch of said machine base, said eccentric member is controlled by said driving member to move said tightening member to a third position between said first position and said second position.

5. The sawing machine according to claim 3, wherein said stop member comprises a coupling portion located on one end thereof and pivotally connected to said carrier, and a stop portion located on an opposite end thereof for engaging a selected one of the plurality of notches of said machine base.

6. A sawing machine, comprising:
a body unit having a machine base and a worktable rotatably mounted on said machine base and rotatable about an axis, said machine base having a plurality of notches located on the periphery thereof and spaced around said axis;
a carrier mounted to said worktable;
a tightening member mounted in said carrier and having a first end portion facing said machine base and a second end portion opposed to said first end portion;
a driving device set having a driving member rotatably mounted to said worktable and an eccentric member rotatable with said driving member to move said tightening member, said eccentric member being selectively rotatable with said driving member forwardly and backwardly among a first position, where said tightening member is moved by said eccentric member into engagement with said machine base, a second position, where said tightening member is moved away from said machine base by said eccentric member, and a third position between said first position and said second position; and
a stop device set having a spring member mounted in said carrier and a stop member positioned between the spring member of said stop device set and said eccentric member, said stop member biased by the spring member of said stop device set to selectively engage one of the notches of said machine base subject to rotation of said eccentric member in releasing the pressure of the spring member of said stop device set to allow the stop member to disengage from the respective notch.

7. A sawing machine comprising:
a body unit having a machine base and a worktable rotatably mounted thereon;
a carrier mounted to the machine base and carrying a driving device set and a tightening member;
wherein the driving device set includes a driving member having an operating end portion disposed outside of the carrier and an opposed coupling end portion rotatably mounted to the carrier, and wherein the tightening member is mounted in the carrier;
an eccentric member fixedly located on the coupling end portion of the driving member and coupled to the tightening member such that rotation of the operating end portion of the driving member causes movement of the tightening member at least between a first position, where the tightening member is moved by the eccentric member into engagement with the machine base, and a second position, where the tightening member is moved away from the machine base by the eccentric member;
a plurality of notches spaced around a periphery of the worktable; and
a stop device set having a spring member mounted in the carrier and a stop member positioned between the spring member and the eccentric member;
wherein the stop member is biased by the spring member to selectively engage one of the notches of the machine base subject to rotation of the eccentric member in releasing the pressure of the spring member to allow the stop member to disengage from the respective notch.

8. The sawing machine according to claim 7, wherein the tightening member comprises a first end portion facing the machine base and a second end portion opposed to the first end portion and having an eyelet coupled with and movable by the eccentric member.

9. The sawing machine according to claim 7, wherein the carrier is substantially U-shaped.

10. The sawing machine according to claim 7, wherein the carrier is fixedly mounted on a bottom wall of the worktable.

11. A sawing machine comprising:
a body unit having a machine base and a worktable rotatably mounted thereon;
a carrier mounted to the machine base and carrying a driving device set and a tightening member;
wherein the driving device set includes a driving member having an operating end portion disposed outside of the carrier and an opposed coupling end portion rotatably mounted to the carrier, and wherein the tightening member is mounted in the carrier;
an eccentric member fixedly located on the coupling end portion of the driving member and coupled to the tightening member such that rotation of the operating end portion of the driving member causes movement of the tightening member at least between a first position, where the tightening member is moved by the eccentric member into engagement with the machine base, and a second position, where the tightening member is moved away from the machine base by the eccentric member;
a safety device including a barrel fixedly mounted to the carrier, a spring member accommodated in the barrel and a ball positioned between the spring member in the barrel and the coupling end portion of the driving member;
wherein the driving member further comprises a plurality of retaining notches located on and spaced around the periphery of the coupling end portion thereof; and
the ball being biased by said spring member into selective engagement with one of the plurality of retaining notches.

12. The sawing machine according to claim 11, wherein the tightening member comprises a first end portion facing the machine base and a second end portion opposed to the first end portion and having an eyelet coupled with and movable by the eccentric member.

13. The sawing machine according to claim 11, wherein the carrier is substantially U-shaped.

14. The sawing machine according to claim 11, wherein the carrier is fixedly mounted on a bottom wall of the worktable.

* * * * *